(12) United States Patent
Buffat et al.

(10) Patent No.: US 12,296,462 B2
(45) Date of Patent: May 13, 2025

(54) FLUID DEVICE FOR SUCTION GRIPPING

(71) Applicant: COVAL, Montelier (FR)

(72) Inventors: Emmanuel Buffat, Mauves (FR); Loïc Joguet, Soyons (FR); Michel Cecchin, Montelier (FR); Pierre Milhau, Chatuzange-le-Goubet (FR)

(73) Assignee: COVAL, Montelier (FR)

( * ) Notice: Subject to any disclaimer, the term of this patent is extended or adjusted under 35 U.S.C. 154(b) by 441 days.

(21) Appl. No.: 17/638,455

(22) PCT Filed: Aug. 26, 2020

(86) PCT No.: PCT/EP2020/073900
§ 371 (c)(1),
(2) Date: Feb. 25, 2022

(87) PCT Pub. No.: WO2021/037938
PCT Pub. Date: Mar. 4, 2021

(65) Prior Publication Data
US 2022/0339799 A1    Oct. 27, 2022

(30) Foreign Application Priority Data

Aug. 27, 2019 (FR) .................................... 19 09441

(51) Int. Cl.
*F15B 13/08* (2006.01)
*B25J 15/06* (2006.01)
(Continued)

(52) U.S. Cl.
CPC ......... *B25J 15/0625* (2013.01); *F16K 27/003* (2013.01); *F04F 5/36* (2013.01); *F15B 13/0821* (2013.01)

(58) Field of Classification Search
CPC ... F04F 5/36; F04F 5/20; F16K 27/003; B25J 15/0625; F15B 13/0803–0896
(Continued)

(56) References Cited

U.S. PATENT DOCUMENTS 3,589,387 A * 6/1971 Raymond ........... F15B 13/0896
137/271
4,247,133 A    1/1981 Rudolf
(Continued)

FOREIGN PATENT DOCUMENTS

DE    3818380 A1    12/1988
EP    0728970 A2    8/1996
(Continued)

*Primary Examiner* — Craig J Price
(74) *Attorney, Agent, or Firm* — MUNCY, GEISSLER, OLDS & LOWE, P.C.

(57) ABSTRACT

A fluid flow device including a plurality of fluid flow functional modules each fastened on a respective individual base includes: two parallel lateral faces via which the bases are adapted to be placed against one another; a primary channel passing through the base to open out in its two lateral faces; a front face along which the module extends so as to couple an inlet channel of said module with a secondary channel extending in the base; a check valve closing the secondary channel when the base is not provided with a module; and a top face in which there extends a tertiary channel opening out in the primary channel. The device further includes a fastener for fastening the bases to one another, leaktight couplers for coupling the primary channel and the tertiary channel to a source of fluid under pressure.

7 Claims, 8 Drawing Sheets

(51) Int. Cl.
*F16K 27/00* (2006.01)
*F04F 5/36* (2006.01)

(58) Field of Classification Search
USPC .............. 137/884, 606, 269–271, 596.15
See application file for complete search history.

(56) References Cited

U.S. PATENT DOCUMENTS

| | | | | |
|---|---|---|---|---|
| 4,657,047 | A * | 4/1987 | Kolibas | B05B 12/149 |
| | | | | 235/125 |
| 4,815,496 | A * | 3/1989 | Nishitani | F15B 13/0821 |
| | | | | 137/271 |
| 5,082,245 | A * | 1/1992 | Kast | F16L 29/02 |
| | | | | 251/149.6 |
| 6,036,107 | A * | 3/2000 | Aspen | B05B 9/0423 |
| | | | | 137/884 |
| 6,053,198 | A | 4/2000 | Atkin et al. | |
| 7,909,064 | B2 * | 3/2011 | Natili, Jr. | F15B 13/0821 |
| | | | | 251/149.6 |
| 8,020,946 | B2 * | 9/2011 | Iyatani | B60T 8/368 |
| | | | | 303/119.2 |
| 8,844,596 | B2 * | 9/2014 | Medley | B60C 23/002 |
| | | | | 152/428 |
| 9,897,113 | B2 * | 2/2018 | Berthelsen | B65G 25/065 |
| 9,903,221 | B2 * | 2/2018 | Jacobs | F01D 21/16 |
| 10,465,722 | B2 * | 11/2019 | Stoesser | F15B 13/0814 |
| 10,865,909 | B2 * | 12/2020 | Yu | F16K 51/02 |
| 11,015,719 | B2 * | 5/2021 | Ogino | F16K 1/425 |
| 11,933,328 | B2 * | 3/2024 | Asahara | F15B 11/024 |
| 2015/0211739 | A1 * | 7/2015 | Loveless | F23N 5/247 |
| | | | | 137/544 |
| 2023/0116100 | A1 * | 4/2023 | Qi | F15B 13/0839 |
| | | | | 137/625.48 |
| 2024/0035585 | A1 * | 2/2024 | Morris | E03C 1/021 |

FOREIGN PATENT DOCUMENTS

| | | | |
|---|---|---|---|
| EP | 0860609 A2 | 8/1998 | |
| FR | 3100290 A1 * | 3/2021 | ......... B25J 15/0625 |
| JP | H08100799 A | 4/1996 | |
| WO | WO 9804840 A1 | 2/1998 | |
| WO | WO 2015169830 A1 | 11/2015 | |

* cited by examiner

FLUID DEVICE FOR SUCTION GRIPPING

The present invention relates to the field of distributing fluid flow, in particular for handling by vacuum.

More particularly, the invention relates to a fluid flow distribution device for pneumatic components such as ejectors or Venturi vacuum pumps.

BACKGROUND OF THE INVENTION

Ejectors are commonly used to supply the vacuum needed for suction handling operations, and more particularly for moving objects that are difficult to grasp or fragile.

In outline, an ejector comprises a duct including a Venturi type nozzle having:
- an inlet orifice for coupling to a compressed air supply circuit;
- an outlet orifice for a jet of air accelerated by the nozzle; and
- a suction orifice arranged between the inlet orifice and the outlet orifice, through which suction is created by the jet of air flowing between the inlet orifice and the outlet orifice.

The suction orifice is connected to at least one suction cup arranged to be applied against the object to be grasped.

Vacuum gripper devices generally include a plurality of suction cups connected to the suction orifices of a plurality of ejectors. Compressed air is conveyed to each of the ejectors by individual feed ducts connected to the inlet orifices of said ejectors. Since the number of ducts is linked to the number of ejectors, the compressed air feed circuit of the device becomes correspondingly more complicated and voluminous with increasing number of ejectors, and in particular this can make it complicated to replace ejectors for maintenance or repair purposes.

Vacuum gripper devices are known that have a plurality of ejectors received in a single reception base that forms a system for retaining and quickly changing ejectors. Inside the reception base there extends a distribution circuit that is connected to a source of compressed air and that has each of the ejectors connected thereto.

Such devices make it possible both to reduce the number of ducts that are needed for feeding compressed air also to the ejectors and to facilitate replacement of said ejectors. Nevertheless, they present the drawback of being capable of receiving only a predefined number of ejectors, which can give rise in particular for the need to acquire a base of greater capacity when one or more ejectors need to be added in order to upgrade a vacuum handling installation.

OBJECT OF THE INVENTION

An object of the invention is thus to provide a modular fluid flow device making it possible to obviate at least some of the above-mentioned drawbacks.

SUMMARY OF THE INVENTION

To this end, the invention provides a fluid flow device comprising a plurality of fluid flow functional modules each fastened on a respective individual base comprising:
- two parallel lateral faces via which the bases are adapted to be placed against one another in such a manner that when the bases are placed against one another, two of the bases each have one lateral face that is free;
- a primary fluid transport channel passing through the base to open out in its two lateral faces in identical relative positions; and
- a front face along which the module extends so as to couple an inlet channel of said module with a secondary channel extending inside the base from the front face and opening out in the primary channel.

According to the invention, the device includes fastener means for fastening the bases to one another, leaktight connection means for connecting the primary channels together, and leaktight coupling means for coupling an end of the primary channel opening out in one of the lateral faces to a source of fluid under pressure for feeding the modules.

The number of bases in such a device can thus be matched to the number of modules needed by a fluid flow installation, and it is possible to add a base to the device or to remove a base from the device as a function of changes in the number of ejectors in the installation.

In particular manner, the fluid flow device includes leaktight shutter means for closing the end of the primary channel opening out in the free lateral face that does not have coupling means.

In particular manner, each base includes a top face in which there extends a tertiary channel opening out in the primary channel.

In particular manner, the device includes leaktight shutter means for closing the ends of the tertiary channels opening out in the top faces of the bases.

In particular manner, a rear face of each base and/or its lateral faces include fastener means for fastening to a support.

In an embodiment of the invention, the modules are fastened to the bases by screw fastening.

In another embodiment of the invention, the modules are fastened to the bases by snap fastening.

Advantageously, each base includes a check valve having both an open state and also a closed state in which the check valve closes the secondary channel when the base is not provided with a module.

When a module is removed from its base, such a valve makes it possible to continue to feed fluid under pressure to the other modules.

In particular manner, at least one of the modules is an ejector.

In particular manner, the bases are structurally identical.

The invention also proposes a fluid flow device comprising a single fluid flow functional module fastened on an individual base comprising:
- two parallel lateral faces whereby the base is adapted to be placed against two other bases;
- a primary fluid transport channel passing through the base to open out in its two lateral faces in identical positions;
- a front face along which the module extends so as to couple an inlet channel of said module with a secondary channel extending inside the base from the front face and opening out in the primary channel; and
- fastener means for fastening the base to at least one other base.

In particular manner, the device includes leaktight coupling means for coupling an end of the primary channel opening out in one of the side faces to a source of fluid under pressure for feeding the module.

In particular manner, the device includes leaktight shutter means for closing the end of the primary channel opening out in the free lateral face that does not have coupling means.

In particular manner, the base includes a top face in which there extends a tertiary channel opening out in the primary channel.

In particular manner, the device includes leaktight shutter means for closing the end of the tertiary channel opening out in the top face of the base.

In particular manner, the device includes leaktight coupling means for coupling the end of the tertiary channel opening out in the top face of the base to a source of fluid under pressure for feeding the module.

In particular manner, the device includes leaktight shutter means for closing the ends of the primary channel opening out in the lateral faces.

In particular manner, a rear face of the base and/or the lateral faces include fastener means for fastening to a support.

In an embodiment of the invention, the module is fastened to the base by screw fastening.

In another embodiment of the invention, the module is fastened to the base by snap fastening.

Advantageously, the base includes a check valve having both an open state and also a closed state in which the check valve closes the secondary channel when the base is not provided with a module.

In particular manner, the module is an ejector.

BRIEF DESCRIPTION OF THE DRAWINGS

The invention can be better understood in the light of the following description, which description is purely illustrative and nonlimiting, and should be read with reference to the accompanying drawings, in which.

DETAILED DESCRIPTION OF THE INVENTION

With reference to FIGS. 1A to 1D a fluid flow device in a first embodiment of the invention and given overall reference 1 comprises three ejectors 10, each fastened to a respective individual base 20.

The ejectors 10 and the bases 20 are identical to one another, and in the figures they are distinguished by adding respective letters A, B, and C.

Each ejector 10 presents a body that is substantially in the shape of a rectangular parallelepiped with a duct extending inside it. The duct includes a Venturi type nozzle having:

an inlet orifice 11 having an edge projecting from a rear face 10.1 of the ejector 10 for coupling to a compressed air feed circuit; and a suction orifice 12 having an edge projecting from the rear face 10.1 of the ejector 10 for coupling to a suction circuit that is connected to at least one suction cup.

The ejectors 10A, 10B, and 10C are thus identical to one another.

Each base 20 comprises a body in the shape of a rectangular parallelepiped having two mutually opposite parallel lateral faces, namely a first lateral face 20.1 and a second lateral face 20.2, between which there extends a primary fluid transport channel 21a. The primary channel 21a is substantially rectilinear and opens out in the lateral faces 20.1 and 20.2 of the base 20 in positions that are substantially identical.

Parallel to the primary channel 21a, that extend two first smooth screw-passing holes 24 that are arranged to allow the bases 20 to be fastened to one another, and two second smooth screw-passing holes 25 that are arranged to enable the bases 20 to be fastened to a support by holding one of the two lateral faces 20.1 and 20.2 of the base 20 against a face of the support. At each end, each first hole 24 has a counterbore in order to receive a nut or a portion of the head of a screw engaged in the adjacent base 20, the counterbores being substantially identical in diameter and depth. The counterbores opening out in the first lateral face 20.1 differ from the counterbores opening out in the second lateral face 20.2 in that they include abutments to prevent rotation of the nut or of the screw head. Since the nut and the screw head are hexagonal in shape, in this example the counterbores opening out in the first lateral face 20.1 have two facing parallel faces extending to face two faces of the nut or of the screw head.

The base 20 also has a secondary fluid transport channel 21b extending from a front face 20.3 of the body of the base 20 so as to open out in the primary channel 21a. The secondary channel 21b is substantially perpendicular to the primary channel 21a and to the front face 20.3 of the base 20. The free end of the secondary channel 21b opening out in the front face 20.3 of the base 20 is arranged in such a manner as to receive in leaktight manner the edge of the inlet orifice 11 of one of the ejectors 10.

Figure 3:
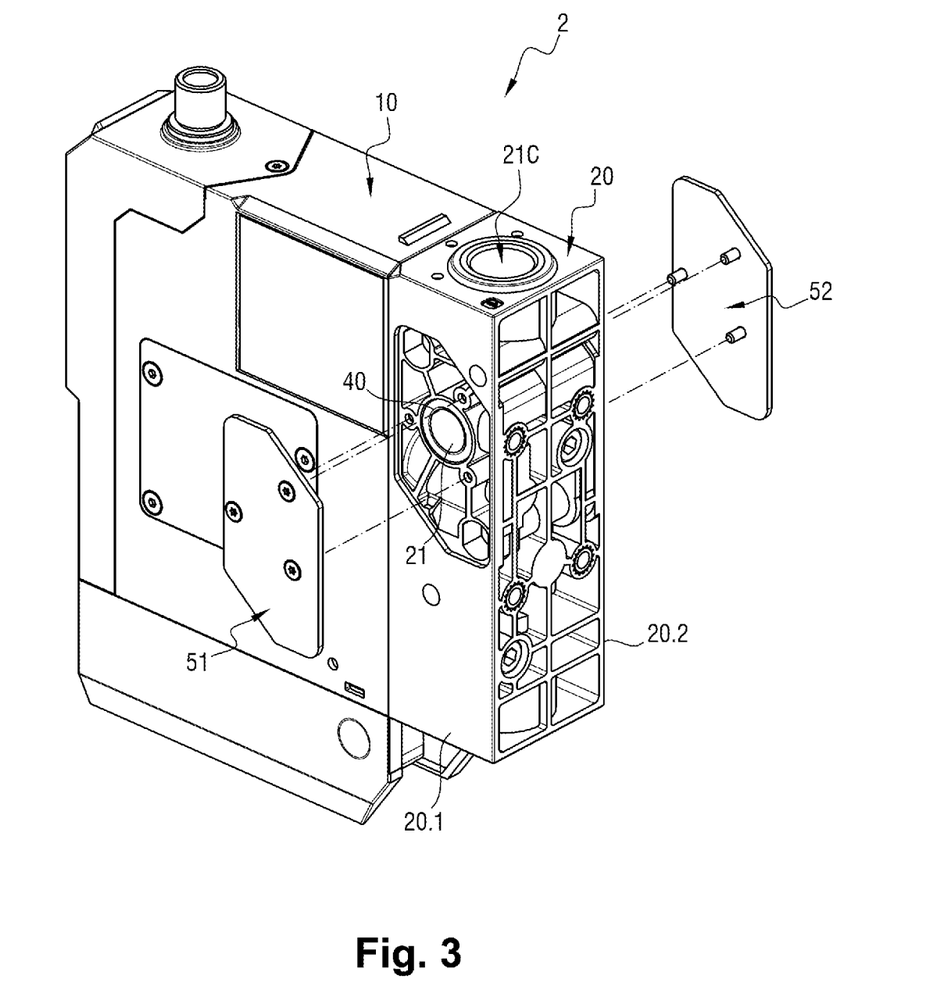
FIG. 3 is an isometric perspective view of a fluid flow device in a second embodiment of the invention.

As can be seen in FIG. 3, the base 20 also has a tertiary fluid transport channel 21c extending from a top face 20.4 of the base 20 so as to open out in the primary channel 21a. The tertiary channel 21c is substantially perpendicular to the primary channel 21a, to the secondary channel 21b, and to the top face 20.4 of the body of the base 20. The free end of the tertiary channel 21c opening out in the top face 20.4 of the base 20 is provided with a leaktight shutter 30 that is cylindrical in shape.

The base 20 also has a quaternary channel 21d extending between the front face 20.3 of the body of the base 20 and a bottom face 20.6 of said body. The end of the quaternary channel 21d opening out in the front face 20.3 of the base 20 is arranged in such a manner as to receive in leaktight manner the edge of the suction orifice 12 of one of the ejectors 10. The end of the quaternary channel 21d opening out in the bottom face 20.6 of the base 20 is arranged so as to be capable of being coupled to the suction circuit.

The base 20 also has two small screw-passing holes 26 extending between the front face 20.3 of the body of the base 20 and a rear face 20.5 parallel to the front face 20.3 and arranged to be capable of having one of the injectors 10 fastened to the base 20, holding the rear face 10.1 of the ejector 10 against the front face 20.3 of the base 20.

The base 20 also has four cylindrical cavities 27 extending from the rear face 20.5 of the base 20 along respective axes perpendicular to said rear face 20.5 and receiving respective threaded inserts 28 serving in particular to enable the body of the base 20 to be screwed to the structure so as to hold the rear face 20.5 of the base 20 against the reception face of the structure by means of screws 60.

The bases 20A, 20B, and 20C are identical to one another.

The device 1 includes a set of fastener elements serving to hold the bases 20A, 20B, and 20C against one another. The set comprises two nuts 31, four first screws 32, and two second screws 33, each first screw 32 being provided with a hollow hexagonal head that is threaded and in which the first screws 32 and the second screws 33 can be screw fastened. The hexagonal heads are of a height that is slightly less than twice the depth of the counterbores of the holes 24.

Initially, the nuts 31 are housed in the counterbores of the holes 24 opening out in the first lateral face 20.1 the base 20A in which they are prevented from turning. Two first screws 32 are then engaged in the holes 24 in the base 20A in order to be screwed into the nuts 31, with the ends of the two first screws 32 projecting from the second lateral face 20.2 of the base 20A.

Thereafter, the first lateral face 20.1 of the base 20B is placed against the second lateral face 20.2 of the base 20A, with top portions of the heads of the two first screws 32 being received in the counterbores of the first lateral face 20.1 of the base 20B in order to be prevented from turning.

Two other first screws 32 are then engaged in the holes 24 in the base 20B in order to be screwed into the hands of the two first screws 32 received in the holes 24 of the base 20A, the heads of the two first screws 32 engaged in the holes 24 in the base 20B projecting from the second lateral face 20.2 of the base 20B.

Thereafter, the first lateral face 20.1 of the base 20C is placed against the second lateral face 20.2 of the base 20B, with top portions of the heads of the two first screws being received in the counterbores of the first lateral face 20.1 of the base 20C in order to be prevented from turning.

The two screws 33 are engaged in the holes 24 in the base 20C in order to be screwed into the heads of the two first screws 32 received in the holes 24 in the base 20C.

Furthermore, the device 1 has a set of connection elements enabling the primary channels of the bases 20A, 20B, and 20C to be coupled together in leaktight manner. The set comprises six O-rings 40 for being received in respective grooves arranged in each of the free ends of the primary channels 21a, and two washers 41 for being screwed onto the first lateral faces 20.1 of the bases 20B and 20C coaxially about the primary channels 21a so that the washers 41 exert light pressure on the O-rings 40 arranged on the first lateral faces 20.1 of the bases 20B and 20C and on the second lateral faces of the bases 20A and 20B when the bases 20A, 20B, and 20C are fastened to one another.

The device also has coupler means 50 for leaktight coupling of the end of the primary channel 21a that opens out in the free lateral face 20.2 of the base 20C to a source of fluid under pressure. The coupling means 50 comprise both a tubular body 50.1 for coupling to a compressed air feed duct and also a fastener plate 50.2 extending from the end of the tubular body. The plate 50.2 is arranged to be screwed onto the second lateral face 20.2 of the base 20C via the second screws 33.

The device 1 also has leaktight shutter means for shutting the end of the primary channel 21a that opens out in the free lateral face 20.1 of the base 20A. The shutter means comprise a cover 51 arranged to be screwed onto the first lateral face 20.1 of the base 20A so as to exert light pressure on the O-ring 40 arranged on the first lateral face 20.1 of the base 20A. The cover 51 is screwed onto the base 20A using the same fastener interfaces as those used for screwing the washers 41 onto the bases 20B and 20C.

Thereafter, the ejectors 10 are fitted on the bases 20 so that the rear faces 10.1 of the ejectors 10 extend along the front faces 20.3 of the bases so as to couple the inlet orifices 11 and the suction orifices 12 of the ejectors 10 respectively to the secondary channels 21b and to the quaternary channels 21d of the bases 20.

Each of the ejectors 10 is held in position on the corresponding base by two screws 60 passing through said base and passing via the holes 26.

Advantageously in this example, the free end of the secondary channel 21b in each base 20 is provided with a ball check valve 21.1 having both an open state and also a closed state in which the ball shuts said free end when there is no ejector 10 coupled to the secondary channel 21b. When one of the bases does not have an ejector, the check valve 21.1 makes it possible to continue feeding fluid under pressure to the other ejectors.

Figure 1A:
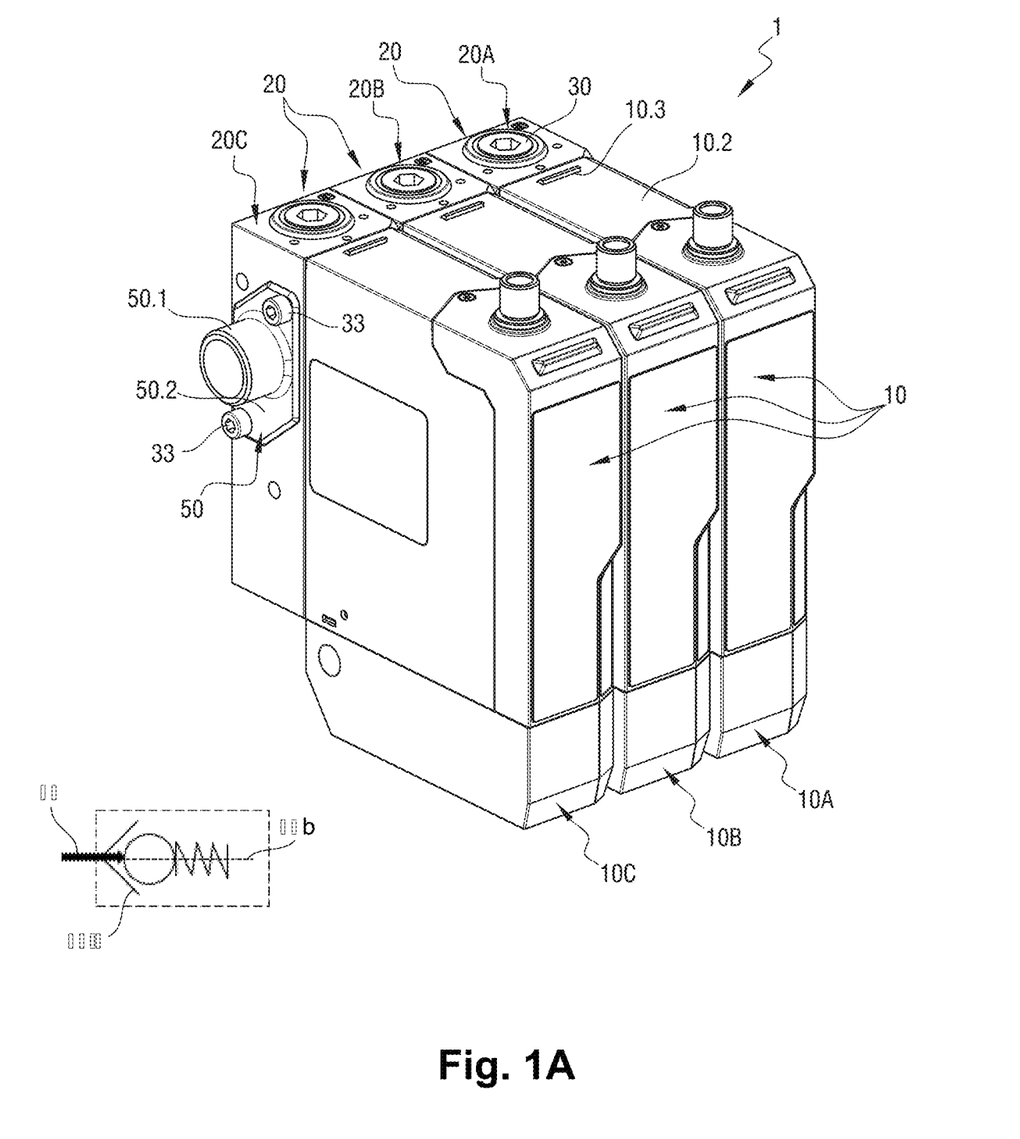
FIG. 1A is an isometric perspective view of a fluid flow device in a first embodiment of the invention.
Figure 1B:
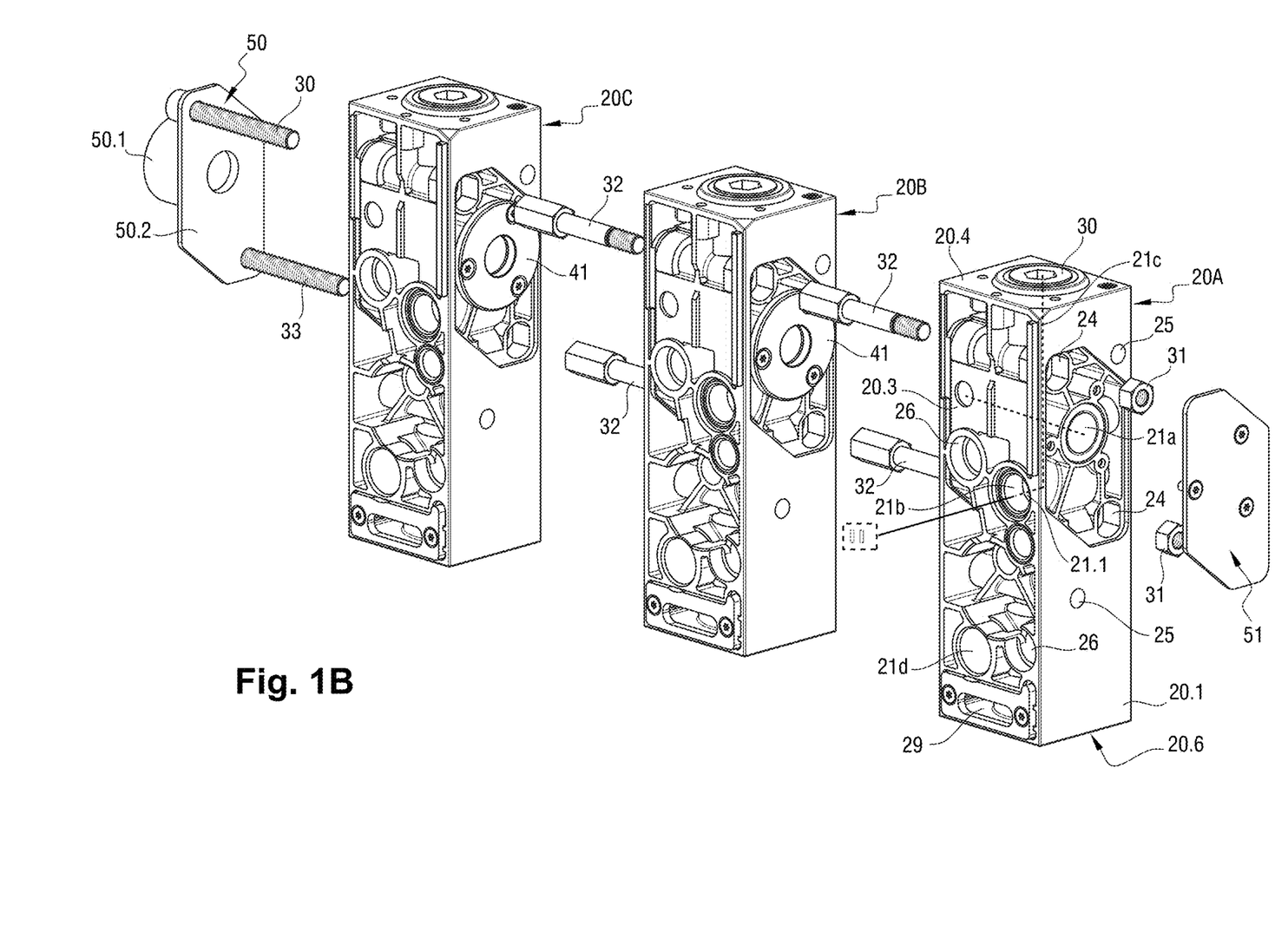
FIG. 1B is an exploded view of a portion of the device shown in FIG. 1A shown in a first orientation.
Figure 1C:
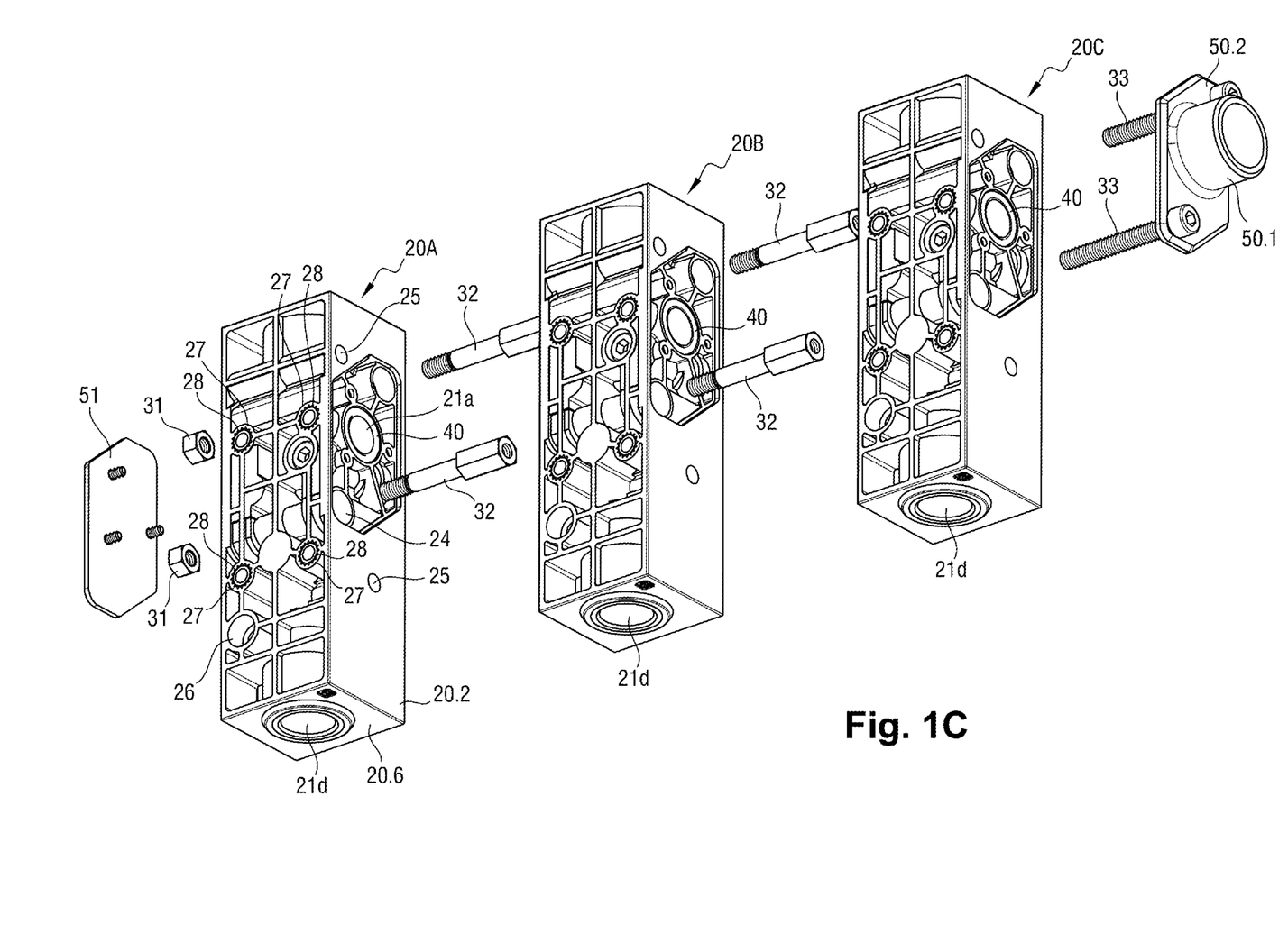
FIG. 1C is an exploded view of a portion of the device shown in FIG. 1A shown in a second orientation.
Figure 1D:
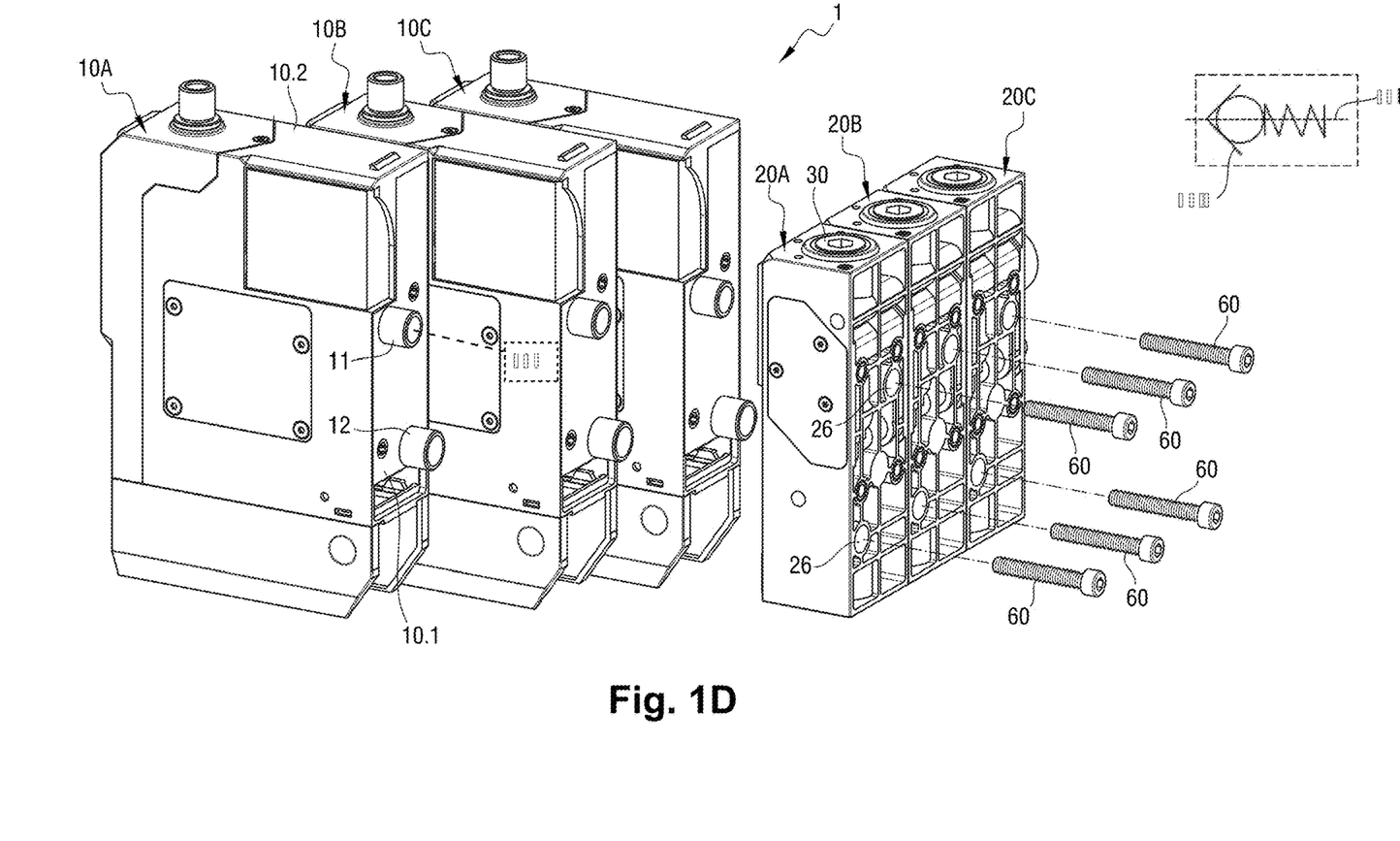
FIG. 1D is an exploded view of the device shown in FIG. 1A.
Figure 2A:
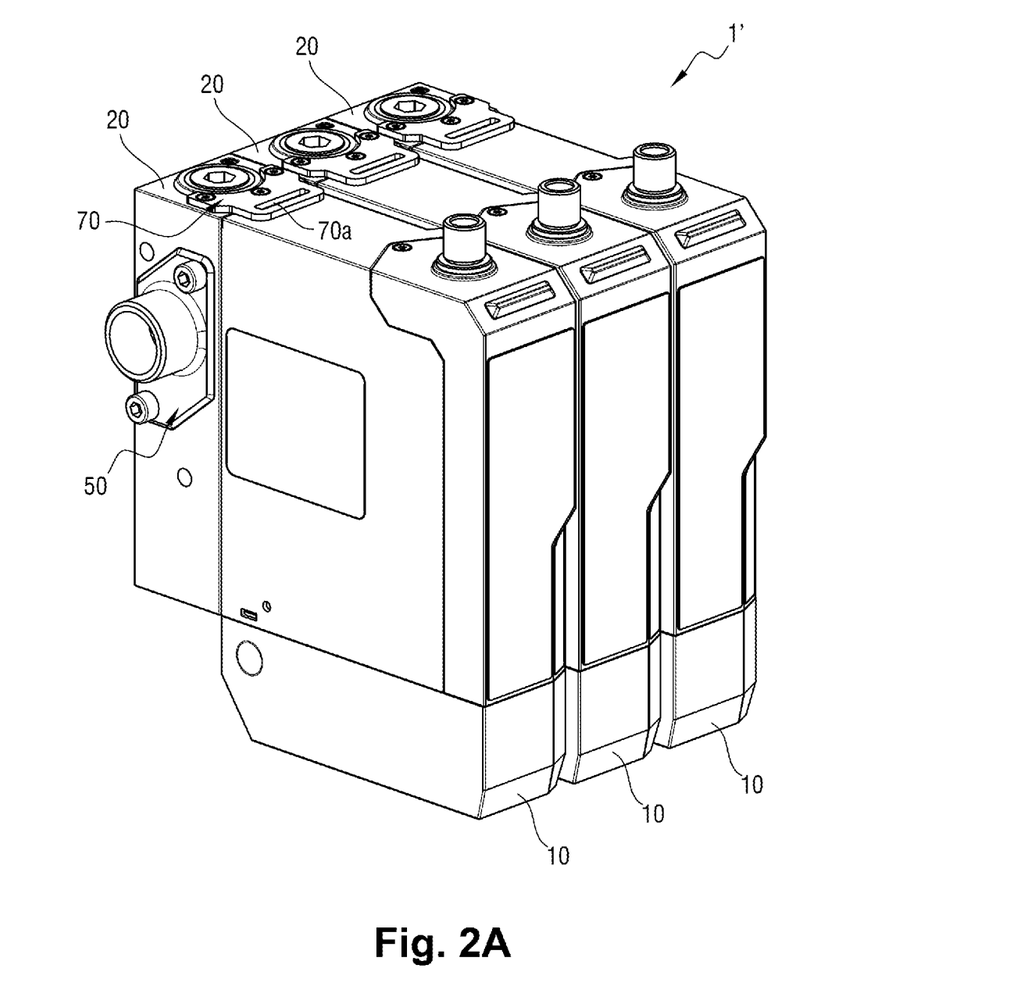
FIG. 2A is an isometric perspective view of a variant of the device shown in FIG. 1A.
Figure 2B:
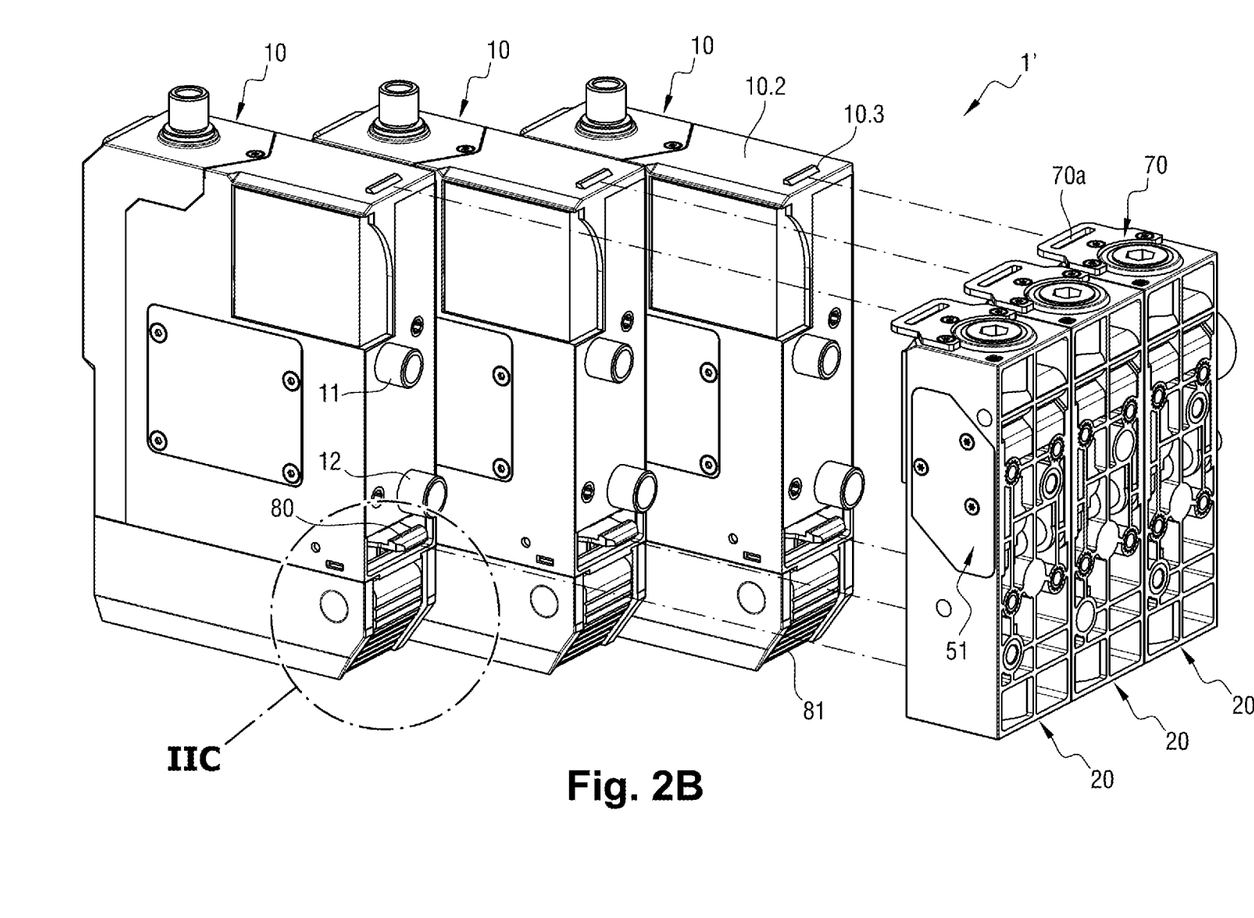
FIG. 2B is an exploded view of the device shown in FIG. 2A.

FIGS. 2A and 2B show a fluid flow device 1' that is a variant of the device 1 shown in FIGS. 1A to 1D. The device 1' differs from the device 1 in that it includes snap fastener means for fastening the ejectors 10 to the bases 20. The snap fastener means take the place of the screws 60 in the device 1 and they enable an ejector 10 to be locked onto a base 20 and to be released therefrom without using a tool.

The snap fastener means comprise three elastically deformable tabs 70 for being screwed onto the top faces 20.4 of the bases 20 in order to project from the front faces 20.3 of said bases 20. Each tab 70 has a free end provided with a slot 70a arranged to cooperate with a portion in relief 10.3 projecting from the top face 10.2 of the associated ejector. Each portion in relief 10.3 is substantially in the shape of a tooth having a ramp. Furthermore, the ejectors 10 of the device 1' differ from the ejectors of the device 1 in that each of them is provided, in its bottom portion, with an elastically deformable hook 80 that projects from the rear face 10.1 of the ejector 10. The hook 80 is mounted to pivot between a release position and a locking position in which the hook 80 cooperates with a slot 29 in the front face 20.3 of a base 20 (visible in FIG. 1B) when the ejector 10 is connected to said base 20.

The hook 80 is mechanically connected to a trigger 81 arranged to move the hook 80 from its locking position towards its release position when pressure is applied on said trigger 81. The trigger 81 thus forms means for controlling the snap fastening of the ejector 10 on the base 20.

In order to connect an ejector 10 on a base 20, the ejector 10 is moved towards the base 20 so that the rear face 10.1 of the ejector 10 is substantially parallel to the rear face 20.5 of the base 20 and the inlet and suction orifices 11 and 12 of the ejector 10 are respectively facing the ends of the secondary and quaternary channels 22b and 21d opening out in the front face 20.3 of the base 20, with this continuing until the portion in relief 10.3 and the hook 80 of the ejector 10 cooperate respectively with the slot 70a in the tab 70 and the slot 29 in the base 20. The ejector 10 is then fastened on the base 20 by snap fastening and without using any tool.

Applying pressure to the trigger 81, which causes the free end of the tab 70 to be lifted a little, then enables the ejector 10 to the disconnected from the base 20 without using any tool.

Figure 2C:
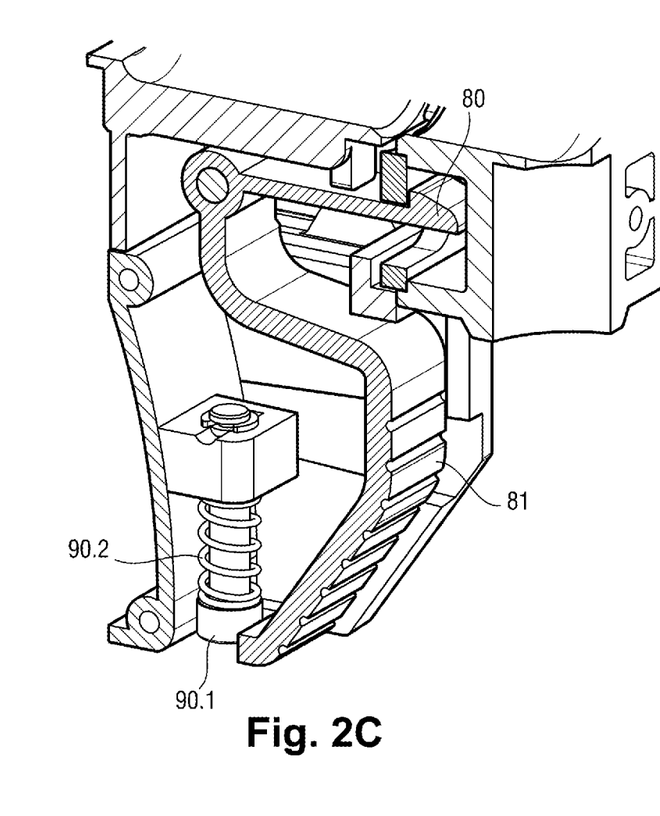
FIG. 2C is a detailed section view of snap fastener means for fastening the ejector to the base, the bolt being in its low position.
Figure 2D:
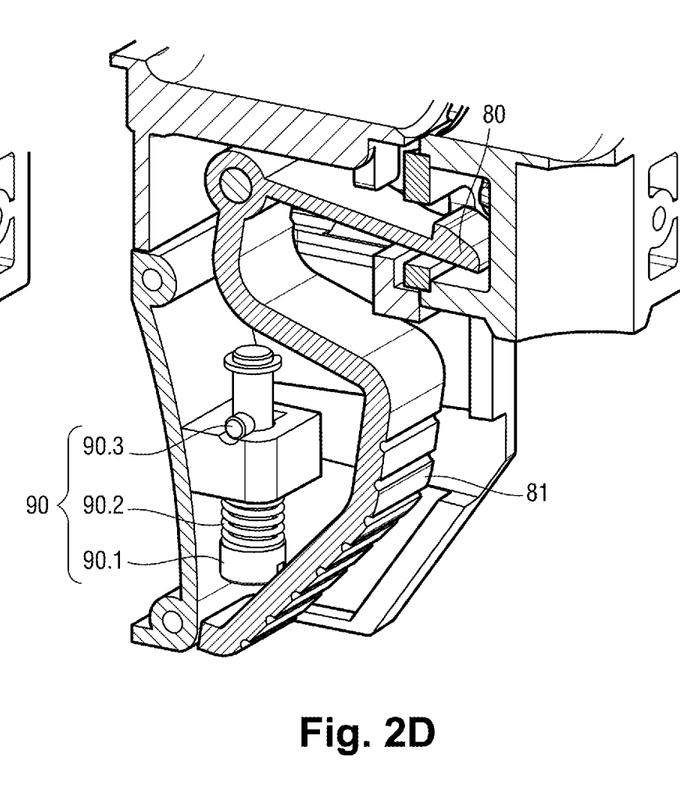
FIG. 2D is a view similar to the view of FIG. 2C, the bolt being in its high position.

Advantageously, and as shown in FIGS. 2C and 2D, the ejector 10 may be provided with a bolt 90 for preventing the trigger 81 from pivoting, thereby preventing any untimely disconnection of the ejector 10.

The bolt 90 comprises a rod 90.1 that is mounted to be movable in translation between a high position in which the rod 90.1 is inactive and a low position in which the rod 90.1 opposes any pivoting of the trigger that would allow the hook 80 to be taken from its locking position to its release position. The rod 90.1 is held in its low position by a compression spring 90.2 constituting a return member. A thrust force applied to the bottom end of the rod urges the rod away from its low position towards its high position, thereby allowing the trigger 81 to pivot. In conventional manner, the rod 90.1 can be held in its high position by quarter turn type locking made possible by a latch 90.3 projecting radially from the rod 90.1.

The rod 90.1 is arranged inside the ejector 10 so that the position of said rod 90.1 cannot be changed without using a tool arranged to be capable of exerting a thrust force on said rod 90.1 and then turning it. In this example, the bottom end of the rod 90.1 includes a slot for receiving a flathead screwdriver.

FIG. 3 shows a fluid flow device 2 having a single ejector 10 fastened on a base 20 and leaktight shutter means for closing the ends of the primary channel 21*a* opening out in the lateral faces 20.1 and 20.2 of the base 20A.

The shutter means comprise a cover 51 and a cover 52 arranged to be screwed respectively on the first lateral face 20.1 and on the second lateral face 20.2 of the base 20A so as to exert light pressure on the O-rings 40 arranged at opposite ends of the primary channel 21*a*.

Unlike the devices 1 and 1', the free end of the tertiary channel 21*c* in the base 20 does not have the shutter 24 and is for coupling to a source of fluid under pressure in order to feed the ejector 10 with compressed air.

In a variant, the cover 52 could be replaced by the coupling means 50 of the devices 1 or 1' in order to couple the primary channel 21*a* in the base 20 to a source of fluid under pressure, with the free end of the tertiary channel 21*c* in the base 20 then having a shutter 24.

Naturally, the invention is not limited to the implementations described but covers any variant coming within the ambit of the invention as defined by the claims.

The number of bases and injectors making up the device could be equal to two or could be greater three.

The fastener screws could be positioned differently, and the snap fastener means could be of a structure that is different from that described.

Although, above, the injectors are fastened on the bases by means of screw or snap fastening, other types of fastening could be envisaged, such as using rods mounted on one of the elements so as to be movable between a position for engaging a portion in relief secured to an adjacent element, and a position for releasing the portion in relief.

The modules could perform functions other than an ejector function.

The modules could be of shapes that are different from one another, with the primary ducts opening out in the lateral faces in relative positions that are identical so as to come into register with one another when the bases are fastened to a support.

The shutter means 51 could be replaced by coupler means 50 for feeding air to all of the ejectors 10A, 10B, and 10C, and/or for feeding air to another set of ejectors.

Although, above, the holes 26 are used for fastening the ejector 10 to the base 20 by means of the screws 60, they could also be used for fastening the base 20 to a frame.

Although, above, the snap fastener control means, specifically the trigger 81, are carried by the ejector 10 in order to facilitate manipulation, they could also be carried by the base 20.

The invention claimed is:

1. A fluid flow device comprising a plurality of fluid flow functional modules each fastened on a respective individual base comprising:
    two parallel lateral faces via which the bases are adapted to be placed against one another in such a manner that when the bases are placed against one another, two of the bases each have one lateral face that is free;
    a primary fluid transport channel passing through the base to open out in its two lateral faces in identical relative positions;
    a front face along which the module extends so as to couple an inlet channel of said module with a secondary channel extending inside the base from the front face and opening out in the primary channel;
    a check valve having both an open state and also a closed state in which the check valve closes the secondary channel when the base is not provided with a module; and
    a top face in which there extends a tertiary channel opening out in the primary channel;
    the device including a fastener for fastening the bases to one another, a leaktight coupler for coupling primary channels with one another, a leaktight coupler for coupling an end of the primary channel opening out in one of the free lateral faces to a source of fluid under pressure in order to feed the modules, and a leaktight coupler for coupling the end of the tertiary channel opening out in the top face of the base to a source of fluid under pressure in order to feed the module.

2. The fluid flow device according to claim 1, comprising a leaktight shutter for closing the end of the primary channel opening out in the free lateral face that have no coupler.

3. The fluid flow device according to claim 2, comprising a leaktight shutter for closing the ends of the tertiary channels opening out in the top faces of the bases.

4. The fluid flow device according to claim 1, wherein a rear face of each base and/or its lateral faces include a fastener for fastening to a support.

5. The fluid flow device according to claim 1, wherein the modules are fastened to the bases by snap fastening.

6. The fluid flow device according to claim 1, wherein at least one of the modules is an ejector.

7. The fluid flow device according to claim 1, wherein the bases are structurally identical.

\* \* \* \* \*